United States Patent [19]

Kotov et al.

[11] 3,818,798

[45] June 25, 1974

[54] TUBULAR KEY CUTTING MACHINE

[75] Inventors: Illijus Kotov, Riverside; Morris Falk; Sidney Falk, both of Chicago, all of Ill.

[73] Assignee: Fort Lock Corporation, Chicago, Ill.

[22] Filed: Jan. 3, 1972

[21] Appl. No.: 215,029

[52] U.S. Cl. .......................... 90/13.05, 76/110
[51] Int. Cl. .............................. B23c 1/16
[58] Field of Search ............. 90/15.1, 13.05; 76/110

[56] References Cited
UNITED STATES PATENTS

| | | | |
|---|---|---|---|
| 1,978,009 | 10/1934 | Caron | 90/13.05 |
| 2,129,087 | 9/1938 | George et al. | 90/13.05 |
| 3,418,882 | 12/1968 | Brand | 90/13.05 |
| 3,495,482 | 2/1970 | Simon | 90/13.05 X |

Primary Examiner—Gil Weidenfeld
Attorney, Agent, or Firm—Wolfe, Hubbard, Leydig, Voit & Osann, Ltd.

[57] ABSTRACT

A tubular key milling machine for machining grooves upon a tubular key blank of accurate axial length and accurate radial depth and at accurate angular locations.

8 Claims, 9 Drawing Figures

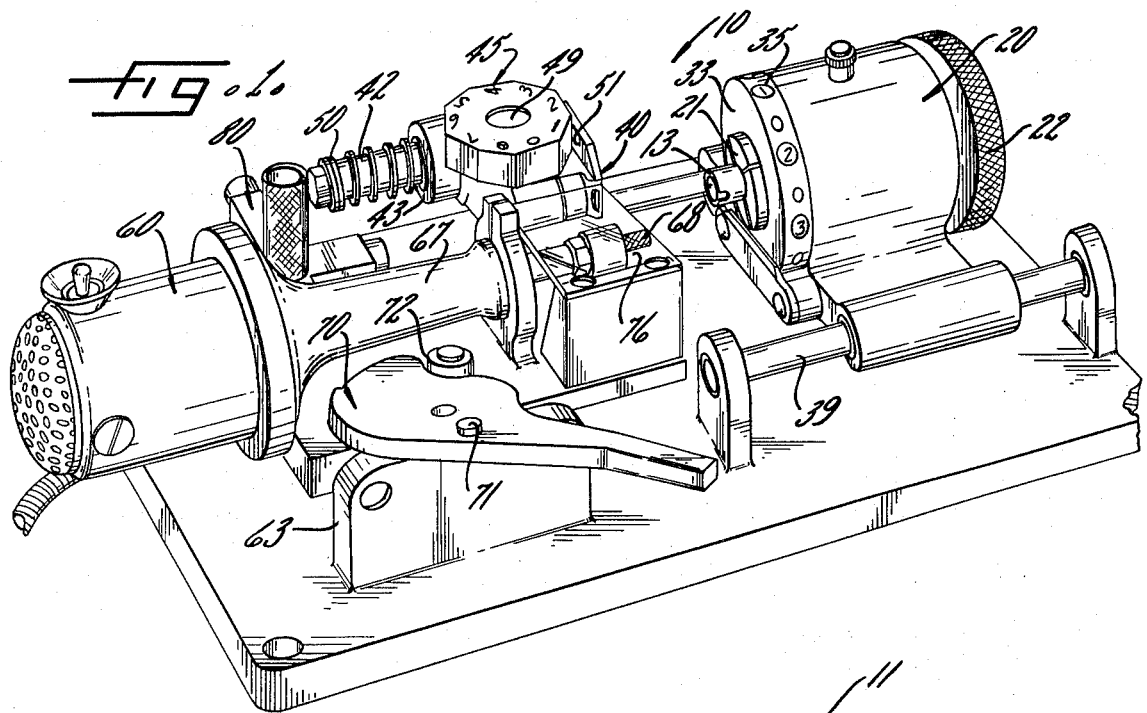
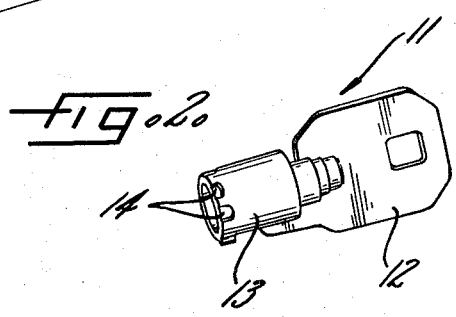
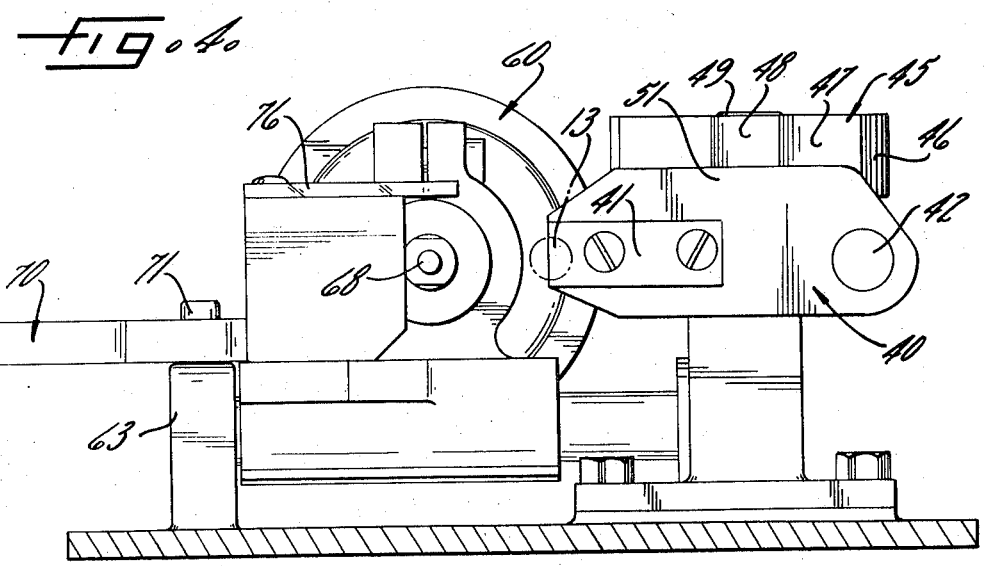

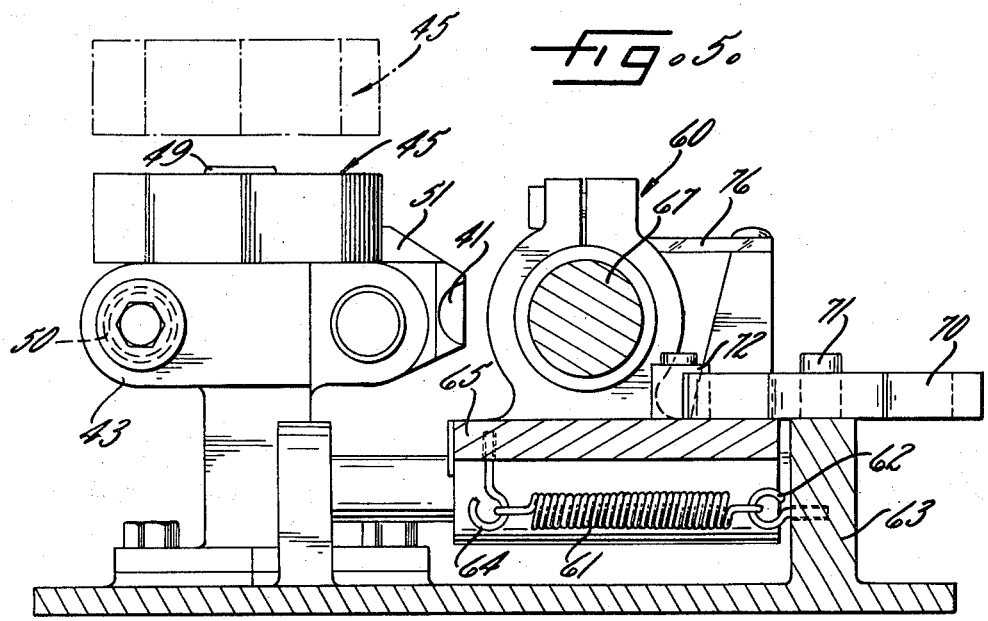
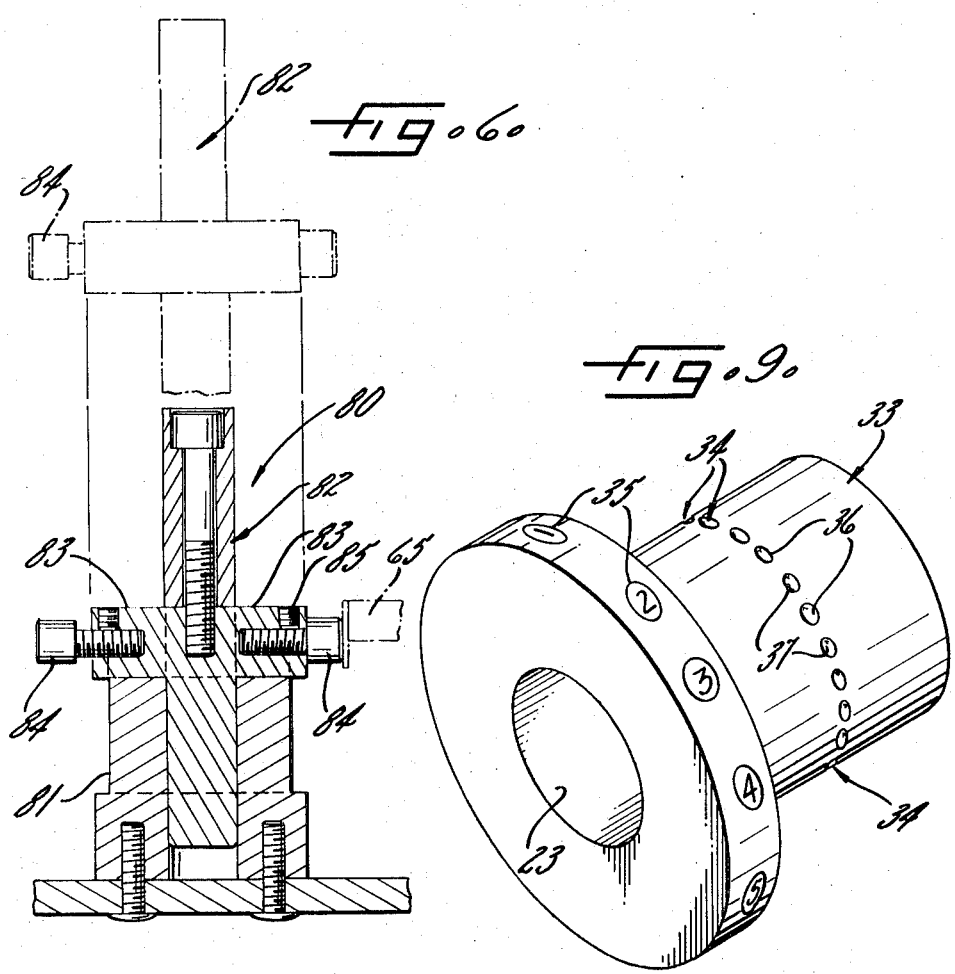

TUBULAR KEY CUTTING MACHINE

BACKGROUND OF THE INVENTION

This invention relates generally to key cutting machines and more particularly concerns a tubular key milling machine wherein a key bite is milled into a key blank in a direction oriented radially to the key blank tube.

Axial pin tumbler locks of the type generally described in U.S. Pat. No. 3,504,748, have become increasingly popular in recent years. This commercial popularity has naturally created an increased demand for the locks and their mating keys and has created a corresponding demand for the rapid production of these keys at low cost. Until now, however, the production of such keys has been a relatively time consuming and difficult task, for the lock-operating bites upon the barrel of a tubular key must be formed with great accuracy of radial depth and axial length of the bite and the angular location of the bite upon the key barrel. Production methods not only have been somewhat time-consuming but also often have required the attention of skilled personnel.

It is therefore the general object of this invention to provide a tubular key milling machine which will permit the rapid and accurate manufacture of tubular keys from key blanks by even inexperienced personnel and at low cost. More specifically, it is an object to provide a tubular key milling machine which will produce key bites of accurate axial length and accurate radial depth at accurately determined angular locations upon a tubular key blank. It is another specific object to provide a tubular key milling machine wherein the key blank may be quickly and easily mounted, cut, and dismounted.

It is another object to provide a tubular key milling machine which will form upon a tubular key blank bites of standard radial depth and axial length and located at standard angular locations without requiring the machine operator to make complex measurements. It is a related object to provide a machine which will enable an operator to form the described bites by simply positioning various parts of the milling machine at predetermined index locations.

It is a further object to provide a machine which will accept all standard sizes of tubular key blanks for key formation. It is yet another object to provide a tubular key milling machine capable of cutting key tube bites to non-standard radial depths and non-standard axial lengths in non-standard angular positions upon the key blank to provide keys for uniquely constructed locks.

Other objects and advantages of the invention will become apparent upon reading the following detailed description and upon reference to the drawings, in which FIG. 1 is a perspective view showing the novel tubular key milling machine in its overall aspect;

FIG. 2 is a perspective view of a typical tubular key formed by the cutting machine;

FIG. 4 is a sectional view taken substantially in the plane of 4—4 in FIG. 3 showing in further detail the key milling head and axial stop apparatus;

FIG. 5 is a sectional view taken substantially in the plane of line 5—5 in FIG. 3 showing in yet further detail the key milling head and axial stop apparatus;

FIG. 6 is a sectional view taken substantially in the plane of line 6—6 in FIG. 3 showing in further detail the radial stop apparatus;

FIG. 9 is a perspective view showing in yet further detail the milling machine chuck collar.

Figure 3:
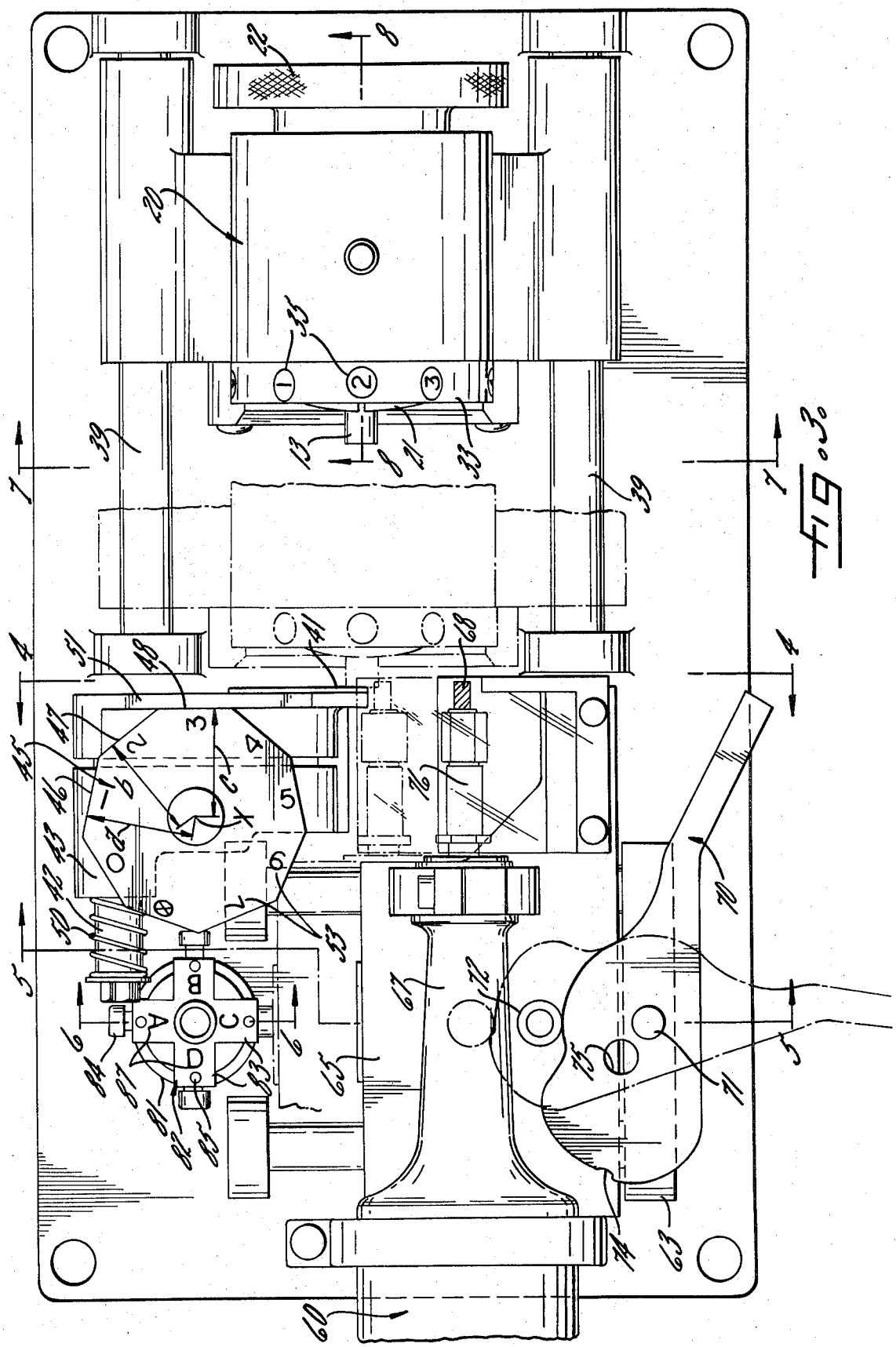
FIG. 3 is a plane view showing in further detail the overall organization of the key cutting machine.
Figure 7:
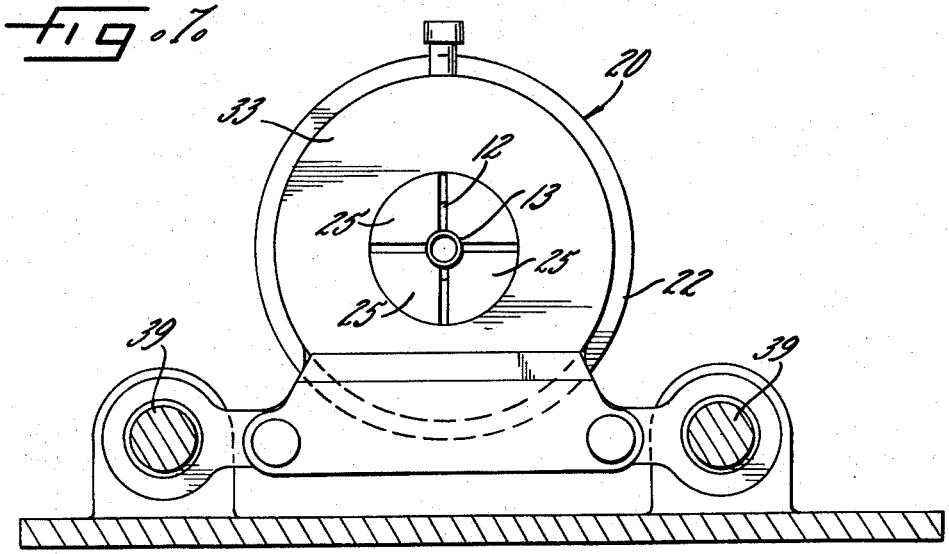
FIG. 7 is a sectional view taken substantially in the plane of line 7—7 in FIG. 3 showing in further detail the key-retaining chuck apparatus of the milling machine.
Figure 8:
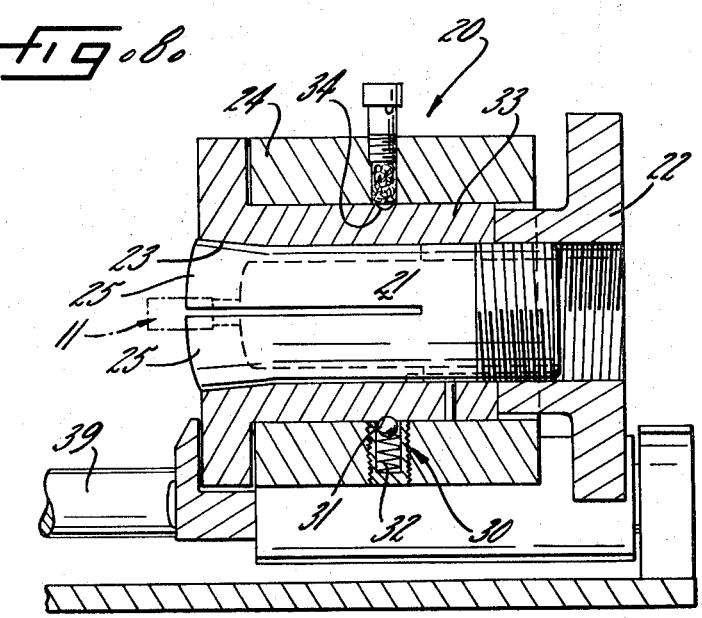
FIG. 8 is a sectional view taken substantially in the plane of line 8—8 in FIG. 3 showing in still further detail the construction of the key-retaining chuck.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention.

Turning to the drawings, there is shown in FIG. 1 an embodiment of the novel key cutting machine 10 comprising the present invention. In operation, the machine forms lock-operating indentations on a key 11 such as that shown in FIG. 2 which is provided with a head 12 and a key tube 13 of any standard diameter. In the context of the present invention, these indentations or bites 14 may be completely defined by describing the angular position of the bite upon the key tube, the axial length of the bite, and the radial depth of the bite.

To operate the machine, the key 11 is first mounted in the machine's chuck 20 which is carried on a base plate. The key 11 and chuck 20 are then rotated into a desired angular position and are next moved in a direction parallel to the key axis into a work position shown in dotted lines in FIG. 3. The axial location of this work position is determined by a first stop mechanism 40. To form the key bite 14 on the key tube 13, a cutter means 60 is then moved along a path oriented radially of the key tube for engagement with the key. In the illustrated embodiment of the invention, the cutter means 60 is moved along this radial path by a levered cam means 70 until a radial depth endpoint is reached. This endpoint for cutter motion is defined or located by a second stop means 80 in the preferred embodiment of the invention.

More specifically, to form a key using the invention, the machine operator first mounts a key blank in the chuck 20. In accordance with one aspect of the invention, the chuck 20, as shown in FIGS. 1, 3, and 7-9, is provided with a chuck nose 21 formed to receive and securely retain the key 11. Appropriate rotation of hand wheel 22 threaded on the chuck nose 21 draws the nose 21 into a conical cam surface 23 formed within the chuck housing 24. This motion of the chuck nose 21 squeezes several key-grasping chuck fingers 25 together, thereby securely grasping and retaining the key 11.

To locate the retained key 11 at a selected angular position, detent means 30 are included in the chuck 20. In the illustrated embodiment, this detent device takes the form of a ball 31 biased by a spring 32 toward a nose-carrying collar 33. The collar 33 is provided with a number of detent ball-receiving depressions 34 (see FIG. 9).

To enable the machine operator to quickly find a desired angular position, index numbers 35 are formed upon the collar 33 for designating the angular location of the chuck nose 21. In the illustrated embodiment, several selected detent depressions 36 are provided on the chuck collar 33 for locating the chuck and key of any of several predesignated standard angular positions, while other detent depressions 37 may be used to locate the key in non-standard angular positions.

When the key 11 has been securely mounted in the chuck 20, the operator moves the chuck and retained key towards the cutter means 60 along ways 39 which are oriented axially with respect to the key tube 13.

To stop the key 11 at a pre-designated work position as it and the retaining chuck are moved in the axial direction, a first axial stop means 40 is provided in accordance with the invention. In the illustrated embodiment, this stop means includes a key-engaging adjustable stop 41 shown in FIGS. 3 and 4. This stop 41 is mounted on a stop 42 shaft carried in a fixed bearing 43 to allow the stop 41 to move in a direction parallel to the axis of the mounted key 11.

To axially position the key stop 41, a rotatable cam 45 having a plurality of faces 46, 47, 48 is mounted on a fixed pivot shaft 49 for selective rotation. A spring 50 is carried on the stop shaft 42 to bias the stop 41 away from the chuck 20. When the operator rotates the cam 45 to position a selected cam face 48 against the rear of a cam plate 51, the location of the adjustable key stop 41 is thereby determined. The chuck 20 and mounted key 11 are then moved along the chuck ways 39 until a portion of the key tube 13 abuts the adjustable stop 41, thereby directly locating the key in its work position in the axial direction.

It is a feature of the invention that the rotatable cam directly provides axial settings corresponding to standard key bite axial lengths. To this end, the differences between the distances A, B, C, from the respective cam faces 46, 47 and 48 to the center of the cam rotation X are the same as the corresponding differences between standard axial depth bites for a tubular key.

To enable the cutting machine operator to quickly identify the cam face corresponding to the desired axial depth of key bite cut, an index 53 is provided adjacent the cam faces 46-48.

When the key 11 has been angularly and axially located in its work position, the cutter means 60 are brought into engagement with the key to form the desired key bite. The cutter means 60, in accordance with yet another aspect of the invention, is positively forced into engagement against the action of a biasing means. As illustrated in FIG. 5, this biasing means takes the form of a spring 61 attached at one end 62 to a head 63 for the cutter ways and at the other end 64 to a movable intermediate platform 65 which carries a key milling device 67.

To positively urge the milling device 67 into engagement with the key tube 13 to form the key bites 14, the illustrated machine is provided with a levered cam 70. This cam 70 is conveniently pivoted about a shaft 71 mounted upon the cutter ways head 63, and engages a cam follower 72 mounted upon the movable intermediate platform 65. As the cam lever is rotated by the machine operator from the position shown in solid lines in FIG. 3 to that shown in dotted lines, the platform-carried milling head 68 is urged against the biasing action of the spring 61 along its radial path into a working position engaging the key. The milling head 68 can be retained in an extreme working position by the engagement of a cam detent surface 74 with the follower 72. A second pivot 75 is provided on the cam 70 for mounting the cam on the shaft 71 in an alternate position upon the machine. To protect the operator, a transparent safety shield 76 is mounted over the milling head 68, through which the milling operation can be observed.

The radial travel of the milling head 68 into the key tube 13 is halted at an endpoint by a second adjustable stop means 80, in accordance with another aspect of the invention. In the illustrated embodiment, this second stop means 80 takes the form of a bumper support 81 fixed relative to the movement path of the intermediate platform 65. A bumper member 82 (see FIG. 6) is provided with a plurality of stops 83 of differing length. To change the endpoint of radial travel of the milling head 68, the machine operator lifts the bumper member 82, rotates it until the desired stop is located for abutment against the intermediate platform 65, and reinserts the bumper member 82 in the bumper support 81. The effective lengths of the bumper stops 83 may be altered by means of the adjustable stop screws 84 and set screws 85. A radial depth-of-cut index 87 is provided on the bumper stops 83 to enable the machine operator to easily locate the desired radial stop position.

When the desired key bite has been formed in the key tube 13, the lever for the cam 70 is released, and the milling head 68 will be returned by the spring 61 to its original position. Thereafter, the angular position index 35, the axial length index 53, and the radial depth-of-cut index 87 may be reset and a succeeding bite 14 formed upon the key tube 13. When all the desired key bites have been formed, the chuck collar 22 is loosened and the newly formed key 11 removed from the key cutting machine.

I claim as my invention:

1. A machine for making tubular keys, comprising, in combination, rotatable chuck means for mounting a tubular key in any of a plurality of preselected angularly displaced locations, key cutter means mounted for movement along a path oriented radially of the key tube for engagement with the key tube, first stop means for relatively locating the key and cutter in any of a plurality of axially displaced locations for engaging the key by the key cutter means in the radial direction, wherein said first stop means includes an adjustable stop member mounted for translational motion in a direction parallel to the axis of the retained key, and rotatable cam means having a plurality of faces formed at a corresponding plurality of distances from the fixed center of cam rotation, the faces being selectively engageable with the adjustable stop member to position the stop member along its direction of travel, thereby correspondingly determining the work position of the retained key in the axial direction relative to said cutter means.

2. A machine for making tubular keys according to claim 1 characterized in that said stop means is positioned for directly engaging the chuck-retained key, thereby directly determining the axial position of the key.

3. A machine for making tubular keys according to claim 1 characterized in that the differences between the distances from the cam faces to the center of cam rotation are the same as the corresponding difference between the standard axial depths of bites for a tubular key.

4. A machine for making tubular keys, comprising, in combination, chuck means for mounting a tubular key in any of a plurality of angularly displaced locations, milling means for forming bites upon the key tube, ways slideably mounting the milling means for movement along a path oriented radially of the key tube, biasing means for urging the milling means along the ways radially away from said key, first adjustable stop means for locating the key in any of a plurality of axially displaced locations for engagement by the key milling means, and a cam follower mounted upon said cutter means and cam means pivotally mounted upon said ways whereby operation of the cam means forces the milling means along the ways into a cutting position against the action of the biasing means.

5. A machine for making tubular keys according to claim 4 wherein said levered cam means is provided with an actuating lever and with a cam follower-engaging detent for retaining said milling means in said cutting position against the action of the biasing means.

6. A machine for making tubular keys, comprising, in combination, rotatable chuck means for mounting a tubular key in any of a plurality of angularly displaced locations, key cutter means mounted for movement along a path oriented radially of the key tube, first adjustable stop means for locating the key in any of a plurality of axially displaced locations, and second adjustable stop means for stopping the travel of the cutting means along said radial path at any one of a plurality of pre-designated locations, and said second adjustable stop means includes a bumper support fixed relative to said path of movement of said cutter means, and a bumper member carrying a plurality of bumper stops of differing length, and being selectively mountable on the bumper support to locate a selected bumper stop in the path of movement of the cutter means, thereby selectively stopping the travel of the cutting means along its radial path and determining the radial depth of the key bite.

7. A method of making a tubular key from a tubular key blank, comprising the steps of mounting the tubular key blank in a chuck, moving the mounted key and chuck relatively toward a milling means, setting a first stop means to halt the axial motion of the key blank relatively toward the milling means at a reference position, wherein the stop directly engages the chuck-retained key and said milling means is in alignment with said stop, readjusting the stop means to a predetermined axial position in accordance with the axial depth of key bite to be made, moving the mounted key and chuck relative toward the milling means in the axial direction until said key blank engages the stop means at the preset location, moving the milling means relatively toward and into engagement with the key blank along a path oriented radially of the key blank, thereby milling a bite upon the key blank with the axial length of said bite being the difference between the distance from the reference position to said readjusted stop means position.

8. A machine for making tubular keys from tubular key blanks, comprising, in combination, a base, chuck means carried by said base for mounting a tubular key blank in any of a plurality of angularly displaced locations, said chuck means being axially shiftable with respect to said base, milling means for forming bites upon the key blank, ways slideably mounting the milling means for movement along a path oriented radially of the key blank, biasing means for urging the milling means along the ways radially away from said key blank, adjustable stop means carried by said base and mounted for translational motion in a direction parallel to the axis of the retained key blank, means for setting the stop means at a reference position in engagement with the retained key blank and relative to said cutter means, and means for selectively changing the position of said stop means in the axial direction, thereby correspondingly determining the axial length of cut by said cutter means when the key blank is moved into contact with said stop means and the milling means is moved along said radial path to form a bite upon the key blank.

* * * * *